June 17, 1969   J. J. NORMAN   3,450,978
RESISTIVE BRIDGE CALIBRATION CIRCUIT

Filed June 1, 1965   Sheet 1 of 2

INVENTOR.
JACOB J. NORMAN
BY Philip Subkow
ATTORNEY

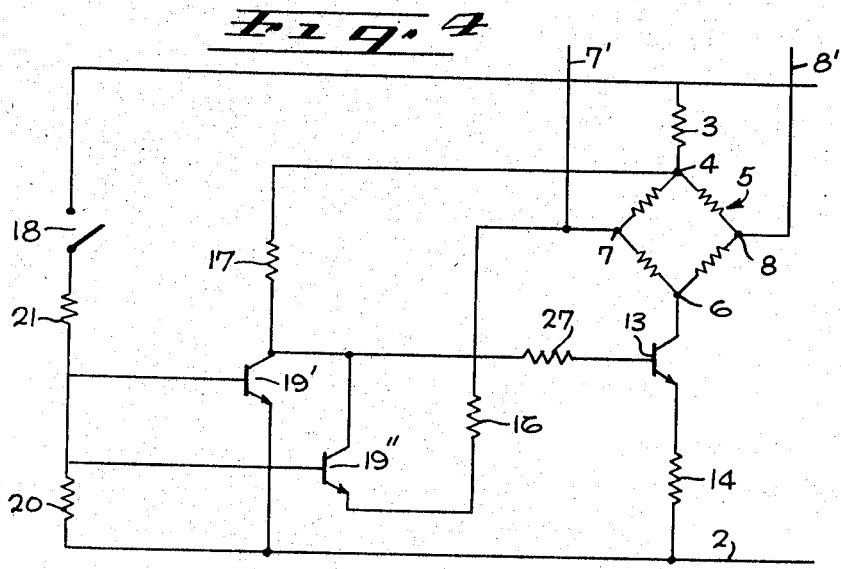
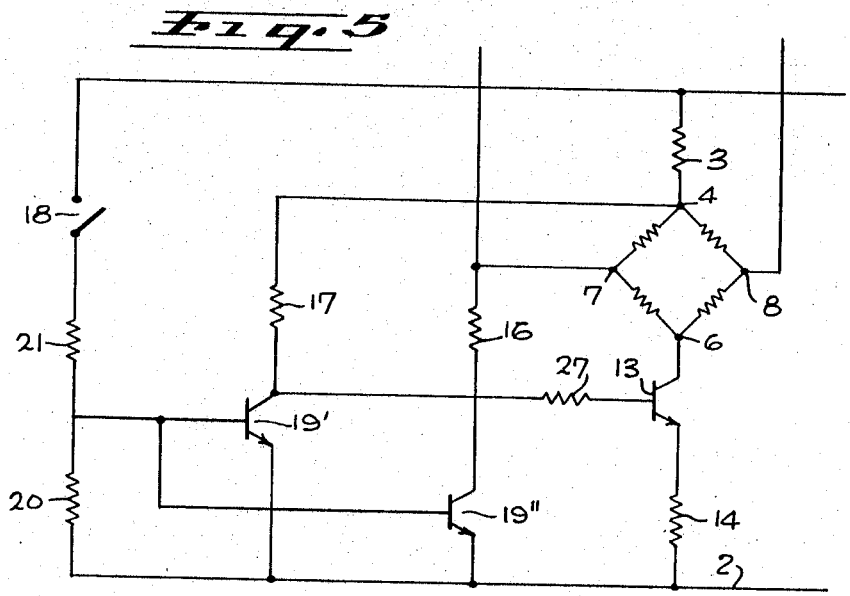

United States Patent Office

3,450,978
Patented June 17, 1969

3,450,978
RESISTIVE BRIDGE CALIBRATION CIRCUIT
Jacob J. Norman, North Oaks, Calif., assignor to Statham Instruments, Inc., Los Angeles, Calif., a corporation of California
Filed June 1, 1965, Ser. No. 460,275
Int. Cl. H02p 13/14, 13/16; G05f 1/16
U.S. Cl. 323—17                                     5 Claims

ABSTRACT OF THE DISCLOSURE

A resistive bridge includes a shunt resistor circuit interrelating one output and one input terminal. Transistor switches are further provided selectively actuatable for controlling the application of excitation power to the bridge circuit, permitting calibration of the bridge whether or not it is affected by a physical stimulus tending to modify the bridge balance. The transistor switching circuit and calibration resistor can be packaged with the bridge, minimizing the impedance effect of transmission lines.

---

This invention relates to a method of and circuit for calibration of a transducer whose sensing element is a resistive bridge. Such sensing elements employing strain sensitive wire whose resistance changes with strain imposed thereon, are well known in this art.

In such transducers the bridge may have one, two, three or four active arms in the sense that their resistance changes with the mechanical stimulus which is imposed on the transducer. It is frequently necessary to check the calibration of the transducer to be sure that the magnitude of the signal output of the transducer, as a function of the magnitude of the stimulus which results in such signal, remains unchanged and that the bridge and the readout systems are functioning properly. Such systems are well-known and are referred to as shunt calibration. It is accomplished by removing the load and placing a resistor in shunt across one of the active arms. In normal operation, when the mechanical stimulus is applied, the shunt calibration resistor is not connected to the bridge. The magnitude of the shunt resistor is related to the bridge resistance, the calibration factor and a number of units of mechanical input to be simulated by the calibrating shunt resistor. The calibration factor is defined as the volts or microvolts of open circuit output of the bridge per volt input per unit of mechanical stimulus applied.

Where the transducer is in an inaccessible location, the shunt calibration resistor and the switch which connects the shunt calibration resistor to the bridge, must be connected by transmission lines. An error is introduced by the transmission line resistance. If these values are known, they may be taken into account in determining the value of the calibration resistor required to give the desired value of the simulated output. In such case, when the simulated output is obtained, equal to the specified fraction of the maximum stimulus for which the transducer is designed, is applied to the transducer, the test will show that the transducer of the bridge and the readout circuit are functioning as designed.

However, when the transmission line resistances cannot be determined, or the stimulus may not be removed at will, such calibration methods are not suitable.

This invention relates to and has for its object a shunt calibration system which will permit the calibration of the transducer without introducing a substantial transmission line resistance error arising from the connections between the shunt calibration resistor and the bridge.

It is an object of my invention to devise a shunt calibration system for a transducer without requiring the removal of the stimulus to obtain an accurate simulated output which is independent of the magnitude of the stimulus applied to the transducer. I accomplish these objectives by placing the shunt calibration resistor in close proximity to the bridge, and thus eliminate the transmission line resistance in the practical effect. The shunt calibration resistor is always in the circuit both at zero stimulus and at all other finite values of the stimulus. The shunt calibration resistor is connected to one output corner of the bridge, and the adjacent input corner is connected through a resistance to one pole of the excitation voltage source. The other output corner is connected through the collector-emitter circuit of a gating transistor to the opposite pole of the excitation voltage source. A switch is placed in the base to emitter circuit of the gating transistor. Where the resistance of the switch and the lines connecting the switch to the circuit does not introduce any substantial resistance, a mechanical switch or its equivalent circuit interrupting means may be employed. Where, however, this is not possible, I may use another gating transistor which then may be controlled by a remote mechanical switch, without the resistance of the switch and its connecting lines materially influencing the results.

The bridge is balanced at zero stimulus with the first switch open and the first gating transistor in conductive condition, or if a second gating transistor is used in place of the switch, with the second gating transistor in nonconductive condition. The system, in its normal operation, operates under these switch conditions. To calibrate the system, the second switch is closed and the first gate is placed in non-conductive condition. The two input corners of the bridge are brought to substantially the same voltage and the total current flow from one input corner to the other output corner, is reduced to a very small value as will be more fully described below.

The current flow through the bridge, which forms the excitation current, is thus reduced to a very small value so that it has but a minimal influence upon the potential difference between the output corners established by the calibration resistor and the associated resistances.

In one configuration this minimal current results in a bridge unbalance of small value at zero stimulus. In order to assure balance, the bridge, with the calibration resistor, must be initially unbalanced in this configuration. With the calibration resistor in the circuit, the bridge is rebalanced internally at zero stimulus. There is thus, at all values of the stimulus, a residual current flow through the bridge.

In another and preferred configuration, I place a second switch in series with the calibration resistor such that when the first switch is closed, the second switch is closed to place the calibration resistor in parallel with one of the active arms of the bridge. In such case, since at zero stimulus, and with the switches opened, the bridge may be balanced. When the switches are closed, the calibration resistor is placed in the circuit and the bridge unbalanced to the desired degree.

The output of the bridge is thus made substantially independent of the stimulus applied, since the output of the bridge, whose resistances are modified by a stimulus, depends not only on the magnitude of the stimulus, but upon the magnitude of excitation current circulating through the bridge from the excitation source. The voltage output at the output corners of the bridge thus depends on the magnitude of the total bridge resistance which is not affected by the stimulus, and the magnitude of the calibration resistor and other associated resistances, all of which are not affected by the applied stimulus.

These and other objects of my invention will be more fully described in connection with the drawings of which:

FIGS. 4 and 5 are modifications of the invention.

Figure 1:
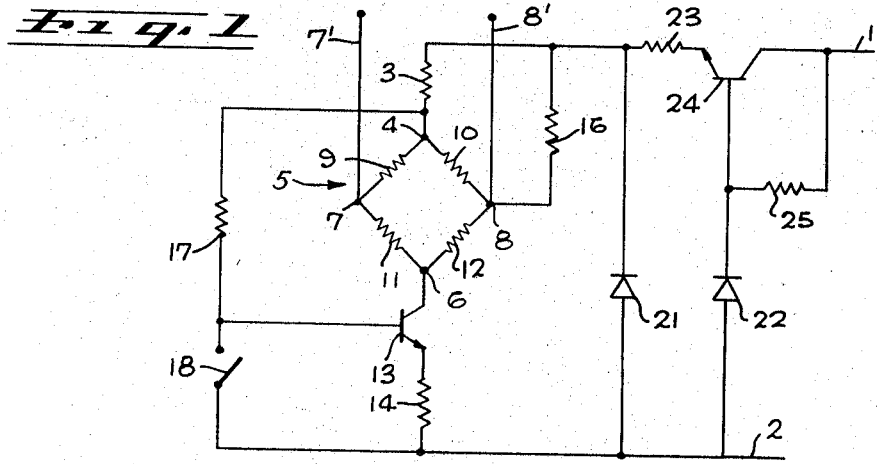
FIGS. 1 and 2 are circuit schematic diagrams of two adaptations of my invention.

In FIG. 1 the bridge 5 is composed of four resistances 9, 10, 11 and 12 which are of the same resistance when no stimulus is applied to the bridge by the condition sensitive element of the transducer. Such transducers and bridges are described in many patents issued to Louis D. Statham, for example, Patent No. 3,058,348 and the patents referred therein.

The bridge is connected at its input corners 4 and 6 to an excitation potential applied at 1 and 2. As is conventional in such bridges, this is usually a constant voltage source. As shown in the drawings, the positive pole 1 is connected through resistance 3 to the input corner 4, and through the resistor 16, here referred to as the calibration resistor to the output corner 8. The other input corner 6 is connected through the collector-emitter circuit of the transistor 13 and the bias resistor 14 to the negative pole 2. The base of the transistor 13 is connected via the switch 18 to the negative pole 2 and through the resistor 17 to the positive pole 1.

As will appear, all temperature and balance compensation resistors have been omitted for purposes of simplification, and may be used as is conventional in this art, and as will be understood by those skilled in this art.

While as stated above, any well regulated power supply to give a constant excitation voltage, is suitable, one I have found useful is illustrated schematically in FIG. 1. It is composed of a Zener diode 21, directly connected as shown between 2 and the common connection of resistor 3 and 16 and a Zener diode 22 connected between line 2 and the base of the transistor 24. The emitter of 24 is connected through the resistors 23 and 3 to the input corner 4, and the collector to 1. A suitable biasing resistor 25 interrelates the base and collector of transistor 24.

Figure 2:
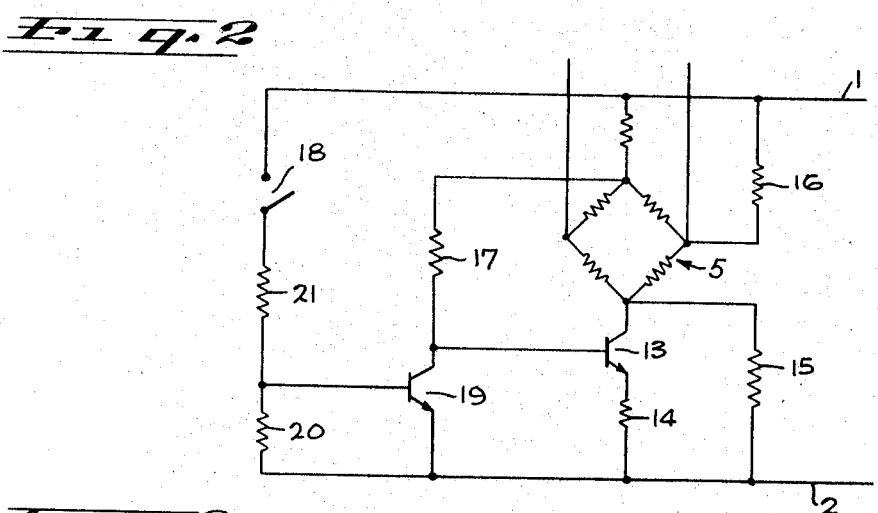

FIG. 2 illustrates a variation of the circuit of FIG. 1. The switch 18, in series with the resistor 17 in FIG. 1, has been replaced by the transistor gate 19 with the collector connected to 17, the emitter to 2 and the collector to the base of transistor 13. The switch 18 is placed in a shunt path between 1 and 2, in series with the voltage divider composed of an upper resistance leg 21, and a lower resistance leg 20. The base of the transistor 19 is connected between the upper 21 and lower legs 20. A high resistance shunt 15 is connected to the collector of 13 and to 2. The same power supply of FIG. 1 may be used and is not shown in FIG. 2.

In both the circuits of FIGS. 1 and 2, the bridge with the switch 18 in FIG. 1 closed is initially balanced at zero load and switch 18 in FIG. 2 open, by adding suitable resistance to one or both of the two adjacent legs of the bridge, as is conventional in this art. Temperature and compensating resistors may also be added in the output or input circuit, as is conventional in the art. The bridge 5 is assumed to be so compensated.

Figure 3:
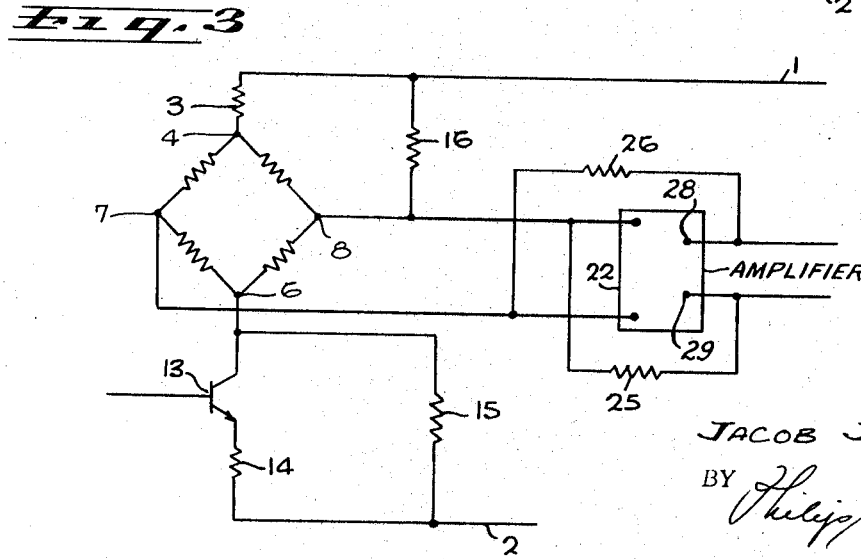
FIG. 3 is a modification which is applicable to FIGS. 1 and 2 showing a feedback circuit.

In FIG. 1, with the switch 18 open, the gating transistor 13 is forward biased and conductive. In FIG. 2, with the switch open, gate 19 is non-conductive and gate 13 is conductive. The resistor 16 has a suitable resistance value substantially higher than the bridge resistance and that of resistor 17. In FIG. 3 the resistance of 15 may be somewhat smaller than that of 16 but is, however, of the same order of magnitude. The usual readout equipment such as amplifiers, meters and recorders and telemetering equipment, may be connected to the bridge output but have been omitted for simplicity.

FIG. 3 shows the application of the feedback system of U.S. Patent No. 3,161,821 to the above system. An amplifier 22 is connected to the bridge output corners and the amplifier outputs are cross connected through feedback resistors 25 and 26 as is fully explained in that patent. The rest of the circuit is as is shown in FIG. 1 or FIG. 2, whichever is employed. The result of this feedback circuit is to bring corners 7 and 8 both to substantially the same potential when a stimulus is applied to the bridge. The amplifier has sufficient open loop gain for this purpose. The output from the amplifier is thus proportional to the open loop output of the bridge i.e., the input which would result if the feedback connectors had not been used.

The magnitude of the resistor 16, in order to obtain a simulated output which is a substantial fraction of the full scale value of the transducer, for example, about 50%, is many orders of magnitude higher than the value of the resistance of the bridge circuit or resistors 3 and 17. This value is determinable by applying circuit analysis which is conventonal in this art, for determining the value of the calibration resistors.

In FIG. 1, when the stimulus is applied to the bridge, the net resistance of adjacent arms are changed to increase the effective resistance of one, and reduce the resistance of the adjacent arm without, however, changing the total resistance of the bridge. A potential difference occurs across 7 and 8, as a result of a bridge unbalance when the feedback resistors 25 and 26 are not used, and thus the open loop unbalance voltage may be read or recorded, amplified and the amplifier voltage read, recorded or telemetered. When the feedback system of FIG. 3 is used, the feedback rebalances the bridge so that with the stimulus applied, the voltage at 7 and 8 is substantially equal, but the amplifier output at 23 is proportional to the open loop voltage, as above described. The resistor 15 is adjusted in value to remove the effect of the feedback resistors on the potential drop across 16, when the switch 18 is closed in calibration, as is described below.

In both forms, with no stimulus applied to the bridge, and with the switch 18 or its equivalent open, the bridge is initially, if the calibration resistor were out of the circuit, unbalanced to a degree and in a direction such that when the calibration resistor is connected, the output at the bridge is at zero.

To calibrate the bridge and the readout circuit, including any amplifier, meters, recorders or telemetering equipment employed, switch 18 in both FIGS. 1 and 2 is closed.

In the circuit of FIG. 1, this produces a reverse bias on transistor 13, since the base is now at a lower potential than the emitter of the transistor. Under this condition, the impedance of the emitter-collector circui of transistor 13 is very high compared to the bridge resistance and the accompanying resistors. The potential at the input corner 6 is made substantially equal to the potential at 4. Substantially, no excitation current flows through the bridge from the input corner 4 to the output corner 7. The current flow is from 1 to 17 and the switch 18. Current also passes through 16. Since the resistance of 16 is much greater than that of 3, a potential difference is established between 4 and 8 and between 4 and 7, and therefore, between 7 and 8. The magnitude of this difference depends on the magnitude of the resistance of 16 and of the bridge arms, and thus may be adjusted to give the value of the potential across 7 and 8 which is to be expected from the bridge by the selected fraction of the stimulus to be simulated by the calibration resistor.

It will be seen that the potential at 7 is different of that in 8, depending on the relative resistance of the resistor 16, resistor 3 and the bridge resistance. By apportioning these resistances, the potential drop between 7 and 8 can be made as described, and independent of the relative resistances of 9 and 10, or 11 and 12. Whatever these values may be, the bridge resistance always is the same in total since the positive variations of adjacent arms are balanced by an equal negative variation in adjacent arms. The voltage difference can be made to be any fraction of the output of the bridge when the maximum load for which the transducer is designed, is applied and the output will be independent of any load which is applied to the transducer. That is, the calibration is independent of the magnitude of this mechanical stimulus which is applied during this calibration.

The circuit of FIGS. 1 and 2, modified by the feedback resistors as shown in FIG. 3, operates as described above, but since the potential between 7 and 8 is adjusted by the feedback, the magnitude of resistor 16 must be designed so that it will supply the desired open loop potential between 7 and 8. Thus, if the open loop potential be lowered by the feedback, the resistance from 16 must be increased to give the requisite potential drop across 16. The shunt resistor is sufficiently high in value so that the current flow around the bridge does not affect the open loop potential difference between 7 and 8 established by the calibration resistor 16. The amplifier will report a voltage proportional to the open loop potential across 7 and 8 similarly to the circuit of FIG. 1, in both the operative and the shunt calibration state.

In the previous discussion, it has been assumed that the switch resistance of 18 and the lines connecting the switch to the base 13, when switch 18 is closed, is but a low value in order that the voltage at the base of the transistor be less than the voltage at the emitter. Ideally, the switch and the connecting line should have substantially zero resistance. It may be desired to have the switch at a remote location so that the resistance of the switch and connecting lines may result in a substantial voltage drop. In such case, the circuit of FIG. 2 may be used where the switch 18 of FIG. 1 is substituted by the gating transistor 19, as described above. With the switch 18 open, no voltage appears at the base of 19 and it is non-conductive. It acts just as the switch 18 acted in the circuit of FIG. 1. The circuit of FIG. 3, in this condition, functions the same as that of FIG. 2 when the switch 18 is open. In FIG. 2, when the switch 18 is closed, transistor 19 becomes conductive, and the circuit functions the same way as it did in that of FIG. 2 when the switch 18 is open. The advantage of this system lies in the fact that the functioning of the transistor 13 is uninfluenced by the resistance of the switch 18 or the connecting switch 18 to 21 or to 1. It may be much greater than that in FIG. 2 without affecting the performance of the system. The range may be increased as the ratio of the resistor 21 to 20 is increased, and the larger is 21, the larger may be the resistance of the switch without substantially affecting the potential at the base 19.

As previously described, the circuit may be modified as in FIG. 3 similarly to that described in connection with FIG. 2.

The systems of FIGS. 1 and 2, or modified as in FIG. 3, will function to check the operation of the entire system including the bridge and the readout equipment and their accuracy without removing the stimulus from the bridge. It will also, particularly if the system of FIG. 2 is employed, be independent of the transmission line and switch resistance, and thus the errors produced by these resistances are eliminated.

Should there be a break in any of the arms of the bridge, or in any of the resistors or a malfunction in the amplifier, the output will not be that to be expected when the resistor 16 is placed in the circuit. The calibration not only checks the accuracy of the bridge, but also checks proper functioning of its parts. Should any two adjacent arms break so as to open the circuit, one of the output terminals 7 or 8 will be disconnected from the output at 7' and 8'. Thus, if arms between 4 and 7 or 6 and 7 break, the terminal 7' will be disconnected. Should both arms between 4 and 8 and 8 and 6 break, the terminal 8' is connected to the input at 1' through 16. The readout will not thus produce the expected output.

In the circuits of FIGS. 4 and 5, the calibration resistor is out of the circuit except when the calibration is to be made. A switch is placed in series with the calibration resistor. In normal operation the switch is open. To calibrate the system, the switch is closed. This places the calibration resistor, resistor 17, transistor 19" (FIG. 4) and transistor 19' (FIG. 5) in shunt with one of the active arms of the bridge. In general concept, this is the usual procedure in shunt calibration.

The feature of my invention, which is also a feature of the forms of FIGS. 1–3, is in the use of a switching device which may be packaged along with the calibration resistor in the same package with the bridge, and thus, the resistance of the lines connecting the switch and the calibration resistor to the bridge, may be minimized.

Another advantage is that the bridge need not be initially unbalanced in order to compensate for the resistance of the shunt connected to the calibration resistor. The bridge is balanced with the calibration resistor out of the circuit.

In FIG. 4, the excitation circuit of FIG. 1 is assumed although not shown. The balance and thermal configuration resistors are assumed but not shown. The circuit of FIG. 4 is the same as that of FIG. 1, like parts being similarly numbered but differing as specified below.

It will be understood that the values of the resistances in the various forms, will differ as will be understood by those skilled in this art.

FIG. 4 differs from FIG. 2 in that the calibration resistor 16 is connected to input terminal 2 through the gating transistor 19' and 19" which function like transistor 19 of FIG. 2. The resistor 27 acts to limit the current to the base of transistor 13 when switch 18 is open because of the base current to the base of 13 when the switch 18 is open. As shown, the calibration resistor 16 is connected to the emitter of 19".

The emitter of 19' is connected to the input terminal 2. The transistors 19' and 19" may be replaced by a single transistor having two emitters to effectively duplicate the connections of the transistors 19' and 19" as in FIG. 4.

FIG. 5 shows an alternative connection of the gating transistor 19". The emitter-collector circuit of transistor 19" is in series with the calibration resistor 16 and the input terminal 2. In other respects the circuit of FIG. 5 and FIG. 4 is the same.

With the bridge in balance, at zero stimulus, switch 18 is closed. The transistors 19' and 19" are placed in a forward biased condition and the transistor 13 is made non-conductive. The potential at 6 is made equal to that at 4. The potential difference between 7 and 8 will be proportional to the ratio of the resistances of the calibration resistor to that of the assoicated resistances in the manner described for the previous forms.

Not only will the system check the calibration of the system and the proper functioning of the components, but it will also identify a break in any of the arms of the bridge.

Thus, should any arm of the bridge break, one of the output terminals 7' and 8' or both will be disconnected from the bridge and there will not be the expected input to the amplifier.

The circuit of FIG. 3 may be applied to the circuits of FIG. 4 and FIG. 5, the rest of the circuit being the same as in FIGS. 4 and 5, whichever is used. This feedback circuit acts as described in connection with FIGS. 1 and 2.

I claim:

1. A Wheatstone bridge shunt calibration circuit comprising a Wheatstone resistance bridge, a pair of excitation input connections to opposite corners of said bridge, output connections to opposite corners of the bridge adjacent to said input connections, a shunt calibration resistor in close proximity to the bridge connected to one of said input connections and to one of said output connections shunting one of the resistances of said bridge, a selectively variable impedance means connected in continuous series relation with said calibration resistor and one of said input connections and means to switch said impedance means from a high impedance state to a low impedance state.

2. The circuit of claim 1, said impedance means and means to switch said impedance means, comprising a gating transistor having a base, collector and emitter, the collector-emitter circuit of said transistor connected in series with said last named input corner and said last named input connections, a switch connected in series in the base to emitter circuit of said transistor in series with said base, whereby when the switch is open said gating transistor is in forward bias conductive condition and when said switch is closed the gating transistor is biased off in nonconductve condition.

3. The circuit of claim 1, said means to switch said impedance means comprising a gating transistor, the emitter collector circuit of said transistor connected in series with the last named input corner and one of said input connections, a second transistor having a base, collector and emitter, the collector to emitter circuit of said second transistor connected in series with the base to emitter circuit of said first named transistor, the base of said first named transistor coupled to one of the electrodes other than the base of said second transistor, a switch in series with the base of said second transistor and the other of said input connections.

4. In the circuit of claim 3, a third transistor having a base, collector and emitter, said calibration resistor connected to said other input connection through the emitter collector circuit of said third transistor in series with the collector emitter circuit of said second transistor and the common connection points of the second and third transistors connected to the base of said first transistor.

5. The circuit of claim 3, a third transistor having a base, collector and emitter, said calibration resistor connected to said other input connection through the emitter collector circuit of said third transistor, and the base of said third transistor connected to the base of said second transistor.

References Cited

UNITED STATES PATENTS

| | | |
|---|---|---|
| 3,209,248 | 9/1965 | Siefert _____ 324—63 |
| 3,354,716 | 11/1967 | Wiebe et al. _____ 73—398 X |
| 2,663,806 | 12/1953 | Darlington. |
| 2,720,113 | 10/1955 | Statham. |
| 3,106,645 | 10/1963 | Kaufman. |
| 3,111,620 | 11/1963 | Baker. |
| 3,319,155 | 5/1967 | Kooiman et al. |

JOHN F. COUCH, *Primary Examiner.*

A. D. PELLINEN, *Assistant Examiner.*

U.S. Cl. X.R.

73—398; 323—75; 324—63